United States Patent [19]

Kim

[11] 4,028,270

[45] June 7, 1977

[54] VINYL POLYMERIZATION INITIATOR AND REDUCING AGENT

[75] Inventor: Oh-Kil Kim, Burke, Va.

[73] Assignee: The United States of America as represented by the Secretary of the Navy, Washington, D.C.

[22] Filed: June 15, 1976

[21] Appl. No.: 696,238

[52] U.S. Cl. .............................. 252/428; 526/204; 526/217

[51] Int. Cl.² .......................................... C08F 4/08

[58] Field of Search ....................... 252/428, 429 R; 526/204, 217

[56] References Cited

UNITED STATES PATENTS

| | | | |
|---|---|---|---|
| 3,594,453 | 7/1971 | Cusano | 526/217 X |
| 3,631,009 | 12/1971 | Meyer | 526/204 |
| 3,689,432 | 9/1972 | Faust | 252/428 |
| 3,857,824 | 12/1974 | Atkins | 526/217 X |
| 3,893,943 | 7/1975 | Willard | 252/428 |

*Primary Examiner*—Patrick P. Garvin
*Attorney, Agent, or Firm*—R. S. Sciascia; Philip Schneider; Thomas McDonnell

[57] ABSTRACT

An olefinic polymerization initiator comprising a micellar complex of a micell-forming detergent selected from the class consisting of $C_{10}$ to $C_{18}$ aliphatic-trimethylammonium bromide, $C_{10}$ to $C_{18}$ aliphatic-trimethylammonium chloride, hexadecyl pyridinium bromide, and hexadecylpyridinium chloride, and a bisulfite in a detergent-to-bisulfite mole ratio from 1:2 to 50:1.

3 Claims, 4 Drawing Figures

– 4,028,270 –

VINYL POLYMERIZATION INITIATOR AND REDUCING AGENT

BACKGROUND OF THE INVENTION

The present invention pertains generally to organic synthesis and in particular to a free radical catalysis of an emulsion-polymerization of olefin.

Throughout the disclosure several terms are repeatedly recited. These terms are now defined for convenience. Olefins are used in the usual sense, i.e., compounds having ethylenic unsaturation (double bond). Vinyls refer to compounds having the moiety: —CH:CH$_2$. A micell is an electrically charged colloidal particle or ion, consisting of oriented molecules. The letters, cmc, refer to the critical micell concentration which is the concentration at which molecules aggregate to form a micell.

Previous catalysts for polymerizing olefins include azobisnitrile compounds, peroxides, persulfates, and the redox type of catalysts, e.g., the combination of a persulfate and bisulfite. Techniques which have been used include the utilization of a catalyst and heat, and photopolymerization. These previous catalysts and techniques for polymerization of olefins had one or more drawbacks. If a high temperature were used, the resulting polymers had a low molecular weight and the cost heating was an added expense. Some of the catalysts were highly combustible and explosive. Others required large quantities to be used and/or were expensive.

SUMMARY OF THE INVENTION

It is therefore an object of this invention to provide a fast, low-temperature, high yield polymerization of olefins to high molecular weight polymers.

Another object of this invention is to provide an inexpensive, versatile catalyst for polymerizing olefins.

And another object of this invention is to provide a catalyst free of handling problems.

These and other objects are achieved by the polymerization of 5 to 35 weight percent aqueous solution or suspension of an olefin catalyzed by a micellar complex of a long chained cationic micell-forming detergent and a bisulfite in a detergent:bisulfite mole ratio from 1:2 to 50:1 added in an olefin:detergent-bisulfite total mole ratio from 60:1 to 10:1, at a temperature from 20° to 70° C, and at a pH from 3 to 7.

BRIEF DESCRIPTION OF THE DRAWINGS

For a further understanding of the present invention, reference may be made to the accompanying drawings in which.

DETAILED DESCRIPTION OF THE INVENTION

Figure 1:
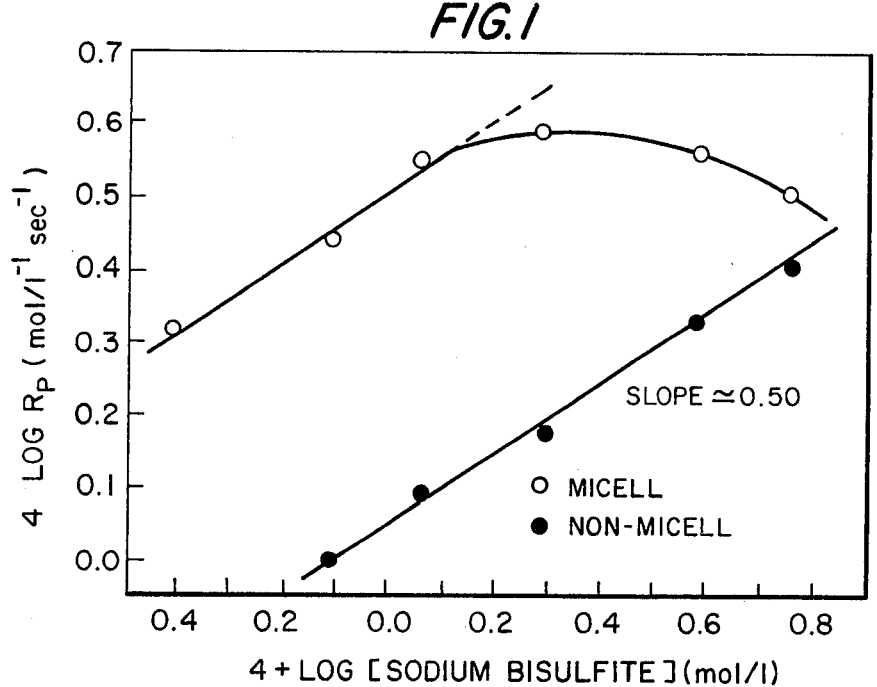
FIG. 1 is a double logarithmic plot of the initial rate of polymerization, $R_p$, of acrylamide against the sodium bisulfite concentration for a reaction system wherein [CTAB] = $1.37 \times 10^{-2}$ M, [Acrylamide] = 1.4 M, pH = 5.3, and T = 30° C.

The practice of this invention is especially suited for polymerizing vinyls and in particular acrylamide, acrylate, acrylonitrile, and styrene. In the practice of the present invention, any cationic detergent with a carbon chain longer than 10 carbon atoms may be used. Examples of such detergents are aliphatic-trimethylammonium bromide or chloride such as cetyltrimethylammonium bromide, or dodecyltrimethylammonium bromide, or octadecyltrimethylammonium bromide, hexadecylpyridinium bromide or chloride, and polysoaps such as those derived from polyvinylpyridine by alkylations. Based on cost, availability, and effectivenss, the preferred detergents are aliphatic-trimethylammonium bromides with an aliphatic chain from 12 carbon atoms to 16 carbon atoms. The most preferred detergent is cetyltrimethylammonium bromide. The bisulfite ions which complex with the micell may be provided by any salt. Preferably sodium or potassium bisulfite is used and most preferably sodium bisulfite is used.

Olefins are polymerized by first preparing a 5 to 35 weight percent aqueous solution or suspension of the olefin. Agitation is applied in a degree sufficient to insure a uniform distribution.

If the olefin monomer does not have a strong electron affinity, e.g., acrylamide, methyl methacrylate and styrene then the aqueous-olefin solution/suspension must have a nonoxidizing atmosphere, e.g., nitrogen or argon in order to have any significant polymerization. Oxygen reacts with the catalytic complex in competition with the monomer so that the polymerization is retarded or inhibited. On the other hand oxygen is needed if the olefin monomer has a strong electron-affinity, e.g, acrylonitrile or methyl acrylate because the oxygen assists the catalytic action of the complex. The oxidizing atmosphere may be air, oxygen, or the like.

In polymerizing an olefin for the first time by the method of this invention, it is recommended that the polymerization is conducted in a non-oxidizing atmosphere. If the polymerization proceeds poorly then conduct the polymerization in an oxidizing atmosphere. Most olefins require a non-oxidizing atmosphere.

The pH of the aqueous olefin solution/suspension is, in almost all cases, from 4 to 6. The polymerization can proceed with a pH from 3 to 7, but a pH from 4 to 6 is preferred. If it is desired to adjust the pH, adjustment is preferably made by adding a dilute acid such as hydrochloric or sulfuric acid or by adding a dilute base such as an amine or sodium hydroxide. Polymerization proceeds best with a temperature from 30° to 50° C. An acceptable polymerization is obtained if the temperature is from 20° to 75° C.

To the aqueous olefin solution/suspension a cationic detergent is added to the olefin. Mixing is continued. Next a bisulfite is added. The detergent:HSO$_3$ mole ratio is from 1:2 to 50:1 and preferably from 1:1 to 3:1. The optimum ratios of these two compounds depend on the olefin monomer. For some olefins, ratios outside the broad range may be used with some success. The mixing and temperature are maintained until the end point is reached as determined by monitoring the polymer by standard techniques.

The general nature of the invention having been set forth, the following examples are presented as specific illustrations of the practice thereof. It is understood that the invention is not limited to these examples but is susceptible to different modifications that would be recognized by one of ordinary skill in the art.

EXAMPLE A-1

Polymerization of Acrylamide Catalyzed by Cetyltrimethylammonium Bromide and Sodium Bisulfite

Materials

Acrylamide (Eastman Organic Chemicals) was recrystallized twice from acetone and dried in vacuo at room temperature. Cetyltrimethylammonium bromide (CTAB) was recrystallized from ethanol-acetone. Sodium bisulfite (SB), tetramethylammonium bromide (TMAB), and simple salts were reagent grade and used without further purification. Water used for preparations had a resistivity of $1.5 \times 10^6$ ohm cm.

Polymerization

A 20 ml solution of 10 weight percent (1.4 mol/1) acrylamide in water was placed in a pyrex tube with a magnetic stirrer in a 30° C bath. Nitrogen gas was vigorously bubbled through the solution for 12 minutes, and then the gas inlet tube was lifted above the solution to maintain a nitrogen atmosphere while the detergent and the catalyst were added to the monomer solution. A weighed amount of the detergent was carefully added with stirring, followed by the addition of sodium bisulfite solution using a micro-syringe. The pH of the solution was adjusted with dilute hydrochloric acid or ammonium hydroxide to a desired value (pH 6) prior to the addition of bisulfite. The final pH of the reaction system was measured soon after the addition of the catalyst. The polymerization was initiated almost instantaneously upon adding the catalyst. After a reaction time of 20 minutes, a weighed amount of the reaction mixture was treated with acetone to precipitate the polymer which was then dried in vacuo.

Molecular Weight Determination

Polyacrylamide molecular weight was determined by viscosity measurements and application of the known relationship of molecular weight to intrinsic viscosity:

$$[\eta] = 6.31 \times 10^{-5} \bar{M}_v 0.80$$

The polymerization of acrylamide was examined under different additive conditions. The polymerizations were conducted according to the method of Example A-1. The results are hereinafter given and are presented in Kim et al. *Micellar Interaction and Its Catalytic Role in the Polymerization of Acrylamide Catalyzed by Bisulfite*. In J. Colloid and Interface Science. 55(1): p. 191-6, April 1976 which is incorporated herein by reference.

In the first set of experiments, the bisulfite concentration was varied in order to illustrate the differences in the kinetic behaviors of a micellar CTAB-containing system and a non-micellar system for the polymerization of acrylamide. The kinetic evaluation of the effect of varying the bisulfite concentration was made at a pH of approximately 5.3 to 5.4. The pH of the system was adjusted with a dilute acid or base described previously. Changes in pH during the polymerization were negligibly small.

The differences in the kinetic behaviors of micellar CTAB-containing system and the non-micellar system for the polymerization of acrylamide are illustrated in FIG. 1 wherein the rate of polymerization, $R_p$, is plotted against the sodium bisulfite concentration. The $R_p$ of the non-micellar system is strictly dependent upon the square root of the bisulfite concentration, whereas the $R_p$ of CTAB-containing system showed an increasing deviation from the linearity with increasing bisulfite concentration. The reason for the lowering catalytic efficiency of bisulfite at the high concentration region is most probably due to the excess of free bisulfite not bound to CTAB. Over the lower bisulfite concentration, the $R_p$ of the CTAB system is nearly three times that of the non-micellar system. Thus it can be seen that if the bisulfite is present in a proper amount relative to the amount of cetyltrimethylammonium bromide and the amount of monomer, a significant increase in the rate of polymerization is achieved.

Figure 2:
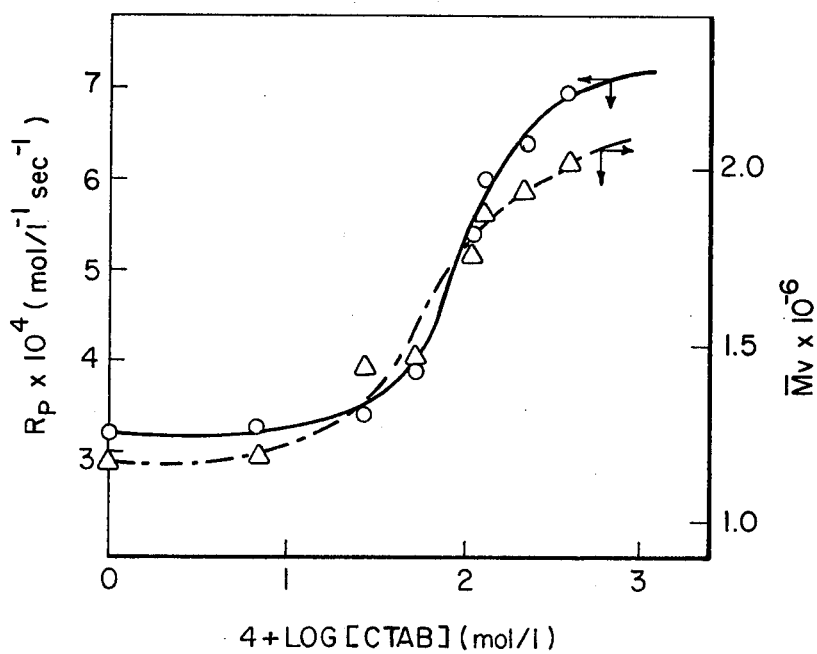
FIG. 2 is a plot of the initial rate of polymerization, $R_p$, and molecular weight, $\overline{M}_v$ of acrylamide as a function of the logarithm of CTAB concentration for a reaction system wherein [SB] = $1.92 \times 10^{-4}$M, [Acrylamide] = 1.4 M, pH = 5.4, and T = 40° C.

Dependences of the $R_p$ and the $\bar{M}_v$ on CTAB concentration are illustrated in FIG. 2. At concentrations of CTAB below the cmc the $R_p$ of the CTAB-containing system is nearly the same as that of the non-micellar system. The $R_p$ increase was small in cmc region but there was a sharp increase in $R_p$ at $[CTAB] \simeq 8 \times 10^{-3}$M, then approaching a limiting value with further increase of CTAB concentration. A similar tendency was observed with the molecular weight relationship. The $\bar{M}_v$ increase at $[CTAB] = 2 \times 10^{-2}$M was approximately double the magnitude of the non-micellar system. Again the powerful effect of the binary catalyst of this invention is demonstrated.

The complex of cetyltrimethylammonium bromide and sodium bisulfite was utilized to catalyze methyl acrylate. The experimental technique and the result of several polymerizations are hereinafter given.

EXAMPLE B-1

Methyl acrylate (Eastman Organic Chemicals) was purified by distillation before the polymerization. Cetyltrimethylammonium bromide (CTAB) was recrystallized from ethanol-acetone. Sodium bisulfite (SB) was reagent grade and used without further purification.

Polymerization of methyl acrylate was carried out in air atmosphere with a solution of 0.8g (0.465 mol/1) of monomer dissolved in 20 ml pure water or in CTAB (or polycations) solution with stirring at 45° C. The monomer solution remained homogeneous when the temperature was equilibrated, followed by the addition of sodium bisulfite solution using a micro-syringe and then the reaction tube was sealed.

After a reaction time of 60 minutes, the reaction mixture was poured into a beaker and diluted with 20 ml of alcohol since some polymerization conditions resulted in a hazy solution, followed by addition of 200 ml of water to precipitate the polymer. However, in some cases where an emulsion-like solution was produced, sodium sulfate solution was added to the solution to break the emulsion. The precipitated polymer was washed three times with water to eliminate the contamination of the additive.

The polymerization of methyl acrylate was carried out in air since negligible or no polymerization occurred in a nitrogen atmosphere, being analogous to acrylonitrile polymerization. This is a great contrast to the case of acrylamide polymerization where oxygen inhibits the polymerization.

Figure 3:
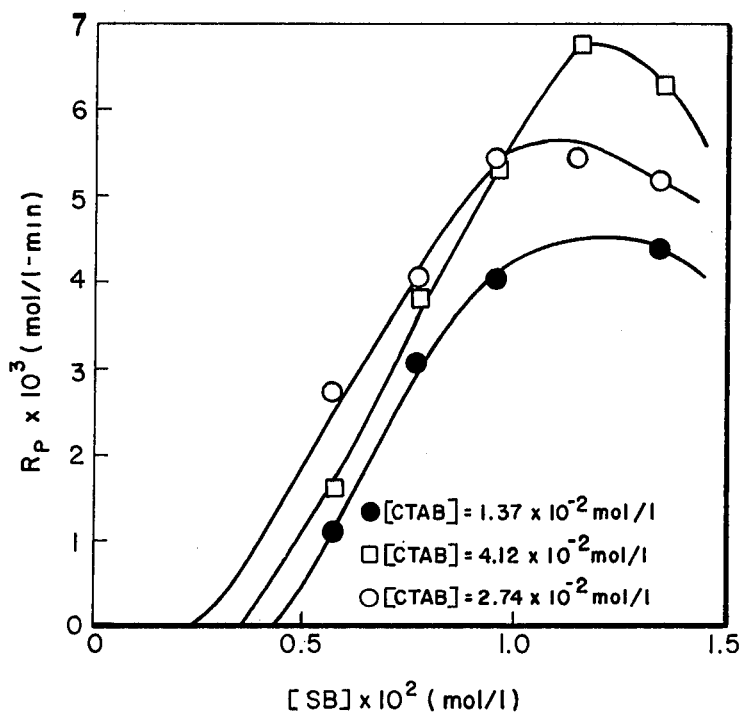
FIG. 3 is a plot of the initial rate of polymerization, $R_p$, methylacrylate as a function of the sodium bisulfite concentration at various CTAB concentrations for a reaction system wherein [MA] = $4.65 \times 10^{-1}$M, pH = 4.6, and T = 45° C.
Figure 4:
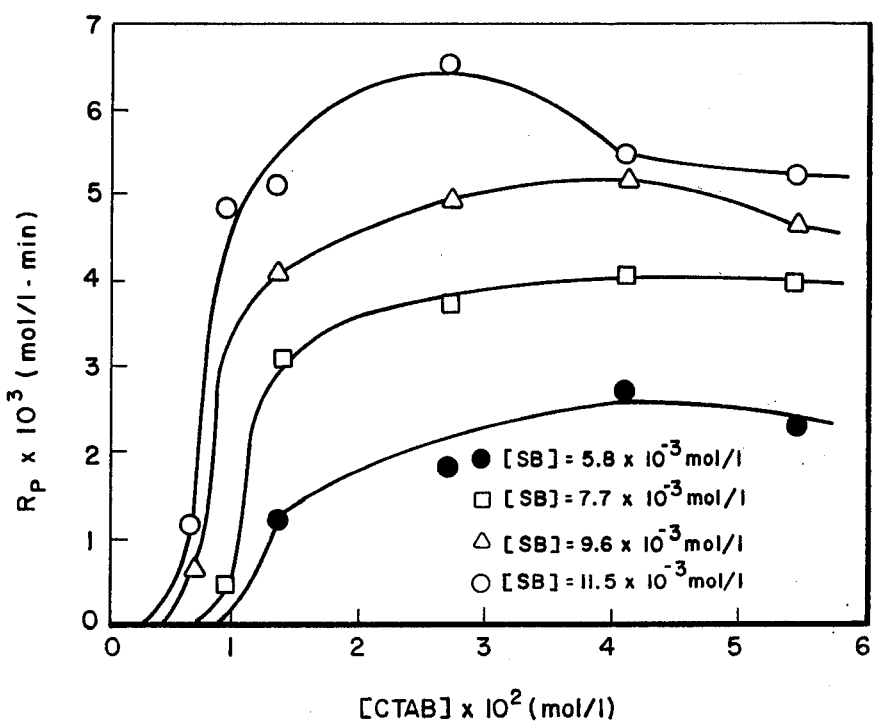
FIG. 4 is a plot of the initial rate of polymerization, $R_p$, methylacrylate as a function of CTAB at various sodium bisulfite concentrations for a reaction system wherein [MA] = $4.65 \times 10^{-1}$M, pH = 4.6, and T = 45° C.

The polymerization of methyl acrylate according to the aforedescribed method was examined under different additive conditions. The results are summarized in FIGS. 3 and 4. In FIG. 3 the rate of polymerization, $R_p$, is plotted against the sodium bisulfite concentration at various CTAB concentrations for a reaction system wherein the methyl acrylate concentration is $4.65 \times 10^{-1}$ mol/l, the pH of 4.6, and the temperature is 45° C. In FIG. 4 the rate of polymerization, $R_p$, is plotted against the CTAB concentration at various sodium bisulfite concentrations for a reaction system wherein the methyl acrylate concentration is $4.65 \times 10^{-1}$M, the pH is 4,6, and the temperature is 45° C. Both figures clearly show the great effect that the catalyst of this invention has on the polymerization on another olefin. In particular, FIG. 4 shows that an absence of CTAB, no polymerization of methyl acrylate occurs.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An olefinic polymerization initiator comprising a micellar complex of a micell-forming cationic detergent selected from the class consisting of $C_{10}$ to $C_{18}$ aliphatic-trimethylammonium bromide, $C_{10}$ to $C_{18}$ aliphatic-trimethylammonium chloride, hexadecyl pyridinium bromide, and hexadecylpyridinium chloride and a sodium or potassium bisulfite in a detergent-to-bisulfite mole ratio from 1:2 to 50:1.

2. The initiator of claim 1 wherein said micell is selected from the class consisting of $C_{12}$ to $C_{16}$ aliphatic-trimethylammonium bromide.

3. The initiator of claim 2 wherein said detergent is cetyltrimethylammonium bromide.

* * * * *